United States Patent
Marton et al.

[11] Patent Number: 6,087,547
[45] Date of Patent: Jul. 11, 2000

[54] METHOD FOR DECOMPOSING TOXIC ORGANIC POLLUTANTS

[75] Inventors: Laszlo Marton, Chapin; Yung-Pin Chen; Mihaly Czako, both of Columbia, all of S.C.

[73] Assignee: University of South Carolina, Columbia, S.C.

[21] Appl. No.: 09/318,593

[22] Filed: May 25, 1999

Related U.S. Application Data

[60] Provisional application No. 60/086,725, May 26, 1998.
[51] Int. Cl.[7] .................................................. A62D 3/00
[52] U.S. Cl. .................... 588/206; 435/262; 435/262.5
[58] Field of Search .......................... 588/206; 435/262, 435/262.5

[56] References Cited

PUBLICATIONS

Yung Pin Chen et al., An Unusual Dehalogenating Peroxidase from the Marine Terebellid Polychaete Amphitrite ornata, Mar. 1, 1996, The Journal of Biological Chemistry, pp. 4609–4612.

*Primary Examiner*—Steven P. Griffin
*Assistant Examiner*—Elin Warn
*Attorney, Agent, or Firm*—Michael A. Mann; Horacio A. Farach; Nexsen Pruet Jacobs and Pollard

[57] ABSTRACT

It has been discovered that an enzyme produced by *Spartina alterniflora* degrades halogenated organics. The present invention is therefore the use of the enzyme produced by genes of this plant to remediate soils contaminated with halogenated organics such as TCE, and to genetically alter other plants to produce this enzyme using the gene that produces plant dehaloperoxidase.

25 Claims, 10 Drawing Sheets

METHOD FOR DECOMPOSING TOXIC ORGANIC POLLUTANTS

PRIORITY CLAIM

This application claims the benefit of U.S. Provisional Application Ser. No. 60/086,725, filed on May 26, 1998.

FIELD OF THE INVENTION

The present invention relates a method for decomposing toxic organic pollutants. In particular, the present invention relates to a method for using plants and enzymes extracted from plants for in situ remediation of contaminated soils and water in wetlands.

BACKGROUND OF THE INVENTION

Haloaromatic and haloaliphatic contamination is a major environmental concern. Pollution often comes from municipal, industrial, agricultural or military sources, and it can enter the food-chain where it may bioaccumulate and pose significant health risks. Even if the sources of pollution are eliminated, the legacy of decades of accumulation of these environmental contaminants will persist.

The reduction of these contaminants in soils by mechanical or chemical technologies to levels approved by the US Environmental Protection Agency is prohibitively costly and very time consuming. The phytoremediation approach, on the other hand, using natural clones of plants is promising and has attracted interest due to its potentially lower cost, low maintenance and sustainability. Plants can also enrich the soil and co-act with microbes in the rhizosphere in the process of remediating the contaminated soil. Plants are suitable for sites where the plume of contamination in the soil is directly accessible for the roots or where the pollutant can be gradually drained and the "plump and treat" procedure applied using constructed plant beds.

The use of plants for removing or stabilizing contaminants in soil and water is an emerging technology that has had many successes. A typical wetland designed for municipal wastewater treatment includes one or more wetland plant species planted in a substrate of sand, soil, or gravel. Wastewater is applied at the upper end and flows slowly down a gentle gradient. The wastewater can be applied onto the surface then collected at the bottom. Reed-beds, for example, are used very frequently in these systems with high efficiency.

Much of what has been learned from the design of wetlands for nutrient removal can be applied to plant beds designed for halogenated organics abatement. The Poaceae (grass) species are prime targets for efforts to identify and improve plant varieties for halogenated organic waste treatment technologies in different environments because many species are dominant, monoculture-forming, perennial vascular plants, and they can thrive in polluted environment while producing a relatively large biomass.

Dehalogenating enzymes are uncommon in higher organisms in general and have not been reported for plants as yet. In bacteria, there are several different types of dehalogenases grouped according to reaction mechanisms (Neidleman & Geigert, 1986; Fetzner & Lingens, 1994) which are discussed briefly below.

1) Reductive dehalogenases replace the halogen atom of a haloorganic compound with hydrogen (C—X(C—H+X). This reaction has been described in several species of aerobic (Johnston et al. 1972) and anaerobic bacteria (DeWeerd et al. 1991). No reductive dehalogenases have been purified to date.

2) The dehydrohalogenase reaction proceeds by simultaneous removal of the halogen atom and the adjacent hydrogen on the neighboring carbon (H—C—C—X(C=C+HX). This reaction works with certain halogenated cyclohexane derivatives and halogenated straight-chain hydrocarbons (Neidleman & Geigert, 1986). Little is known about these enzymes of which none has been purified. Dehydrohalogenation is not always due to enzymatic reaction, these compounds may decompose spontaneously at a certain rate.

3) Hydrolytic dehalogenases (halidohydrolases) replace the halogen atom with a hydroxyl group (C—X+OH(C—OH+X; Goldman et al. 1968) The reaction may be either oxidative or hydrolytic (Scholten et al. 1991). These enzymes are able to attack haloacetates (Smith et al. 1990) and haloaromatic compounds including 4-chlorobenzoate (Elsner et al. 1991; Scholten et al. 1991). Genes encoding halidohydrolases have been cloned from several bacterial species (Elsner et al. 1991) and the nucleotide sequence of the structural genes encoding one enzyme has been reported (Schmitz et al. 1992).

4) Halohydrin epoxidase simultaneously removes the halogen atom and a hydrogen from an adjacent hydroxyl group on the neighboring carbon (HO—C—C—X(C—CO—epoxide+HX) and forms an epoxy bridge. The only known source of this enzyme is a soil bacterium, Flavobacterium sp. (Castro & Bartnicki, 1968). No activity by this class of this enzymes on haloaromatic compounds has been reported or would be expected, but dehalogenation of some polysubstituted halophenois may occur.

5) Oxidative displacement enzymes. Specifically,
  a) peroxidases have been described whose action breaks the carbon-halogen bond by polymerization of free radical intermediates;
  b) oxygenases break the carbon-halogen bond by oxidative hydroxylation of the position adjacent to the carbon bearing the halogen atom (Markus et al. 1984).

Monooxygenases participate in halophenol degradation in several species (Uotila et al. 1992).

In bacteria, many aromatic compounds, including haloaromatics, are dissimilated either through protocatechuate or catechol (o-diphenol) intermediates which are then metabolized to 3-oxoadipate which is subsequently converted to acetyl-CoA and succinate. Toluene, mandelate, benzoate, phenol and some halogenated aromatics are usually dissimilated via the catechol branch pathway (Reineke & Knackmuss, 1984; Chen et al. 1989).

There are two different modes of enzymatic ring cleavage to detoxify halogenated aromatic compounds. The cleavage of the diphenol between the vicinal hydroxyl groups is known as the ortho pathway catalyzed by catechol 1,2-dioxygenase and protocatechuate 2,3-dioxygenase (intradiol dioxygenase). Cleavage of adjacent to the vicinal hydroxyl groups is known as the meta pathway catalyzed by catechol 2,3-dioxygenase and protocatechuate 4,5-dioxygenase (extradiol dioxygenase, Chen et al. 1984). The distribution of various pathways among bacteria is very complex with different pathways operating in species of the same genus (Chen et al. 1984 a&b, 1989).

Bacteria capable of degrading chlorinated aromatics break down these chemicals via a chloro-substituted catechol, which is always ortho-cleaved by a chlorocatechol 1,2-dioxygenase. These modified ortho-cleavage pathway enzymes have wider substrate specificities than ordinary ortho-cleavage pathway enzymes. Modified ortho-cleavage pathway genes from three bacteria have been extensively characterized.

Biotransformation of halogenated aliphatic and aromatic compounds using microbial or enzymatic biocatalysts provide a biotechnological approach to environmental protection. Yet, application of microbial systems in environmental protection technology is still limited, because of certain disadvantages, such as the requirement that the co-metabolism in the microbes have a toxic co-inducer and that the enzymes may have a narrow substrate range and high product selectivity. If the microbes inoculated into the soil are to come into contact with the chemical, they may have to move in the soil and their survival in the competitive microbial milieu is a concern.

Trichloroethene is a small molecule widely used as a solvent and a degreasing agent in industry (Vogel et al. 1987). TCE is volatile and is very difficult to dehalogenate chemically. TCE is a carcinogen and may have many other toxic effects on living organisms (Miller & Guengrich, 1982). Because of industrial waste disposal, TCE is prevalent in soil, groundwater and air. It has been placed on the national priority list of the US Environmental Agency, identifying it as one of the most common pollutants in industrial countries (Omenn 1987). Over the past years, biological degradation of TCE began to emerge as the promising approach to control environmental contamination (Travis & Doty, 1990).

Both anaerobic and aerobic bacteria can convert TCE into other chemicals. However, anaerobic bacteria convert TCE into vinyl chloride, an even more toxic agent (Beak & Jaffe, 1989; Freedman & Gossett, 1989). Thus anaerobic bacteria are not generally screened for the TCE degradation functions.

Fortunately, a number of aerobic bacteria have been identified possessing TCE degradation capability. These bacteria include methanotrops (Wackett & Gibson, 1988), an ammonia-oxidizer (Vannelli et al. 1990), a propare-oxidizer (Wackett et al. 1989), and recombinant *E.coli* strains (Winter et al. 1989, Zylstra et al. 1989). These aerobic bacteria contain a variety of oxygenases. In order to induce expression of these oxygenases in these bacteria, a variety of co-pollutants, such as toluene, phenol, methane, isoprene, propane and 2,4-dichlorophenoxyacetic acid, must be present (Oldenhuis et al. 1989; Wackett et al. 1989). TCE thus serves as a co-oxidative substrate for these oxygenases.

The co-pollutant requirement for TCE degradation potentially limits the use of these bacteria in the environment. In addition, it has been shown that toxic oxidation products generated during the co-oxidation process may result in rapid death of the bacteria (Wackett & Householder, 1989). Thus the current strategy of bacterial degradation of TCE, therefore, is thus somewhat problematic.

As for dehalogenating enzymes in higher organisms, the cytochrome P-450 monooxygenase enzymes are the only known examples and are capable of reductive dehalogenation of alkyl halocarbons under anaerobic conditions (Dawson 1988). Other oxygenases may also participate in dehalogenation reactions, but until now the only such enzymes (other than P-450) were the dehaloperoxidases from a worm (discovered by one of the inventors: Chen et al. 1996). Unfortunately, the worm dehaloperoxidase enzyme produces dehalogenated quinones as end products and which are still toxic. A certain degree of biotransformation of TCE by poplars has also since been reported in April, 1997 (Newman et al. 1997). TCE is converted by poplars to still-toxic derivatives such as trichloroethanol, trichloroacetic acid, and dichloroacetic acid. Traces of radio-labeled carbon dioxide was also produced by poplar tissue cultures when dosed with [$^{14}$C] TCE. indicating very inefficient but detectable (1%–2%) mineralization of TCE. Purification and characterization of the enzyme(s) have not been reported.

Therefore, there remains a need for a cost-effective and efficient way of remediating halogenated organic contaminants in the soil.

SUMMARY OF THE INVENTION

We have detected highly effective dehalogenation and aromatic ring opening activities in the roots of a common wetland plant *Spartina alterniflora* and partially purified the enzyme that is responsible for this activity. A wide variety of haloaromatic and haloaliphatic contamination can be decomposed by the enzyme produced by this species, recommending its use for multiple, mixed pollutants. Both the novel dehalogenating activity and the aromatic ring opening activity in this plant require hydrogen peroxide. Hydrogen peroxide dependence indicates that this enzyme (or enzymes) is an oxidase. The substrates of the enzyme include both chlorine- and bromine-substituted aromatic compounds as well as TCE. The enzyme can break down halophenols with the halogen groups in ortho-, meta- or para-positions. The halophenol dehaloperoxidase, TCE-degrading, and 2,3-dioxygenase activities are all found in the same protein fraction (they co-purify) indicating that a multifunctional enzyme, an enzyme complex, or at least enzymes of similar physicochemical properties are responsible for these activities. The dehalogenating activity is also present in the suspension cell culture and the spent culture medium of this species medium indicating that the enzyme(s) are excreted or persist after release from disintegrated cells. The 2,3-dioxygenase ring cleavage (extradiol dioxygenase) activity suggests that the enzyme is a dioxygenase, or that there is an enzyme complex with an extradiol dioxgenase partial activity. In intact *Spartina alterniflora* plants, the activity is very high in the roots, negligible activity is found in the rhizomes, and none in the shoots.

The halogenated-organics-degrading activities in the Spartina plant is unique in that it is the first plant enzyme(s) known to completely break down both halogenated aromatic compounds and TCE. Because *Spartina alterniflora*, an ecologically important plant species, has enzymes to enhance the mineralization of toxic halogenated organic (HO) contaminants, then it is suitable for use in constructed plant beds for the perpetual removal of these contaminants from the soils or effluent waters. Much of what has been learned from the design of wetlands for nutrient removal can be applied directly to plant beds designed for halogenated organics abatement. The Spartina bed also can serve as the last step in the treatment of waste generated by physical or chemical remediation technologies to further reduce halogenated organic levels to those specified by EPA limits.

Since we have found almost all of the dehaloperoxidase and dioxigenase activity in the root system of our monoculture-forming, perennial plant species, *Spartina alterniflora*, its rhizo-filtration/degradation capacity for different halogenated organic (HO) substrates can be used in hydroponic cultures and mesocosms. Because the HO-s are expected to undergo mineralization, there is no need for the continuous removal and replacement of the root mat, normally a difficult and expensive technological problem (see rhizofiltration of heavy metals, Dushenkov et al. 1995).

*Spartina alterniflora* shows great promise as phytoremediator of sites contaminated by halogenated aromatics and other organics as it naturally breaks down a broad spectrum of these chemicals. The enzyme of Spartina not only can dehalogenate but can also break down the aromatic nucleus of the dehalogenated phenol. It also mineralizes trichloroethene (TCE). *Spartina alterniflora* can be deployed in different soil salinities: it does not require salt yet grows very well in coastal mud flats where salinity levels may surpass that of the ocean. Spartina tolerates reduced soils and high sulfide soils as well.

A further use of *Spartina alterniflora* is that the genes for these plant enzymes can be identified, isolated and transferred by available genetic engineering technology into other important species to widen the spectrum of climatological and ecological conditions where this cost-effective technology can be used.

Still a further application of this discovery is that the gene sequence for producing the enzyme can be use to generate the enzyme for direct application.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

The present invention is phytodehaloperoxidase activity for bioremediation and chemical processing; a substantially pure extract of an enzyme separated from *Spartina alterniflora*; a gene derived from *Spartina alterniflora* that produces this enzyme for use in altering other plant species so that they are also capable of phytoremediation of halogenated organics; and a method of using species of Spartina and *Spartina alterniflora* in particular and parts and cultures thereof for phytoremediation of halogenated organics.

The activity of *Spartina alterniflora* is primarily in the roots and cultured cells of the plant and is on the order of 1 micromole of substrate per milligram of protein per minute. See Table. Loss of the substrate can be quantitatively demonstrated by gas chromatography. A reaction solution containing 50–100 micromoles of halogenated phenols, 500 micromoles of peroxide, 100–200 microliters of the enzyme, 50 millimoles of KH2PO4 (pH 5.3) was allowed to incubate for 15 minutes at a temperature of 28° C. A gas chromatographic analysis was performed using a Varian model 3300 equipped with a fused silica capillary column (15 m×0.53 I.D) coated with a 1.5 micrometer film of crosslinked SE-54 phase (DB-5, J&W Scientific, Folsom, Calif.); the separation was monitored by an electron capture detector and an integrator. Sample size was 0.1 microliter delivered with the aid of a temperature program (100 to 200° C./minute, N2 flow was 30 ml/minute).

The different parts of the plant were separated, rinsed with distilled water, blotted dry and then immediately frozen in liquid nitrogen. The frozen parts were homogenized in the extraction buffer 50 millimoles KH2PO4 (pH 5.3) using an ice cold mortar and pestle and pure sand. The homogenate was centrifuged at 10,000 gs for 20 minutes. The supernatant is the crude extract that was loaded on a Sephandex G25 column and eluted with 0.1 mole KH2PO4 (pH 5.3) buffer. Protein containing fractions (obtained by the Lowry method using serum albumin as standard) were assayed for dehaloperoxidase activity.

Figure 1:
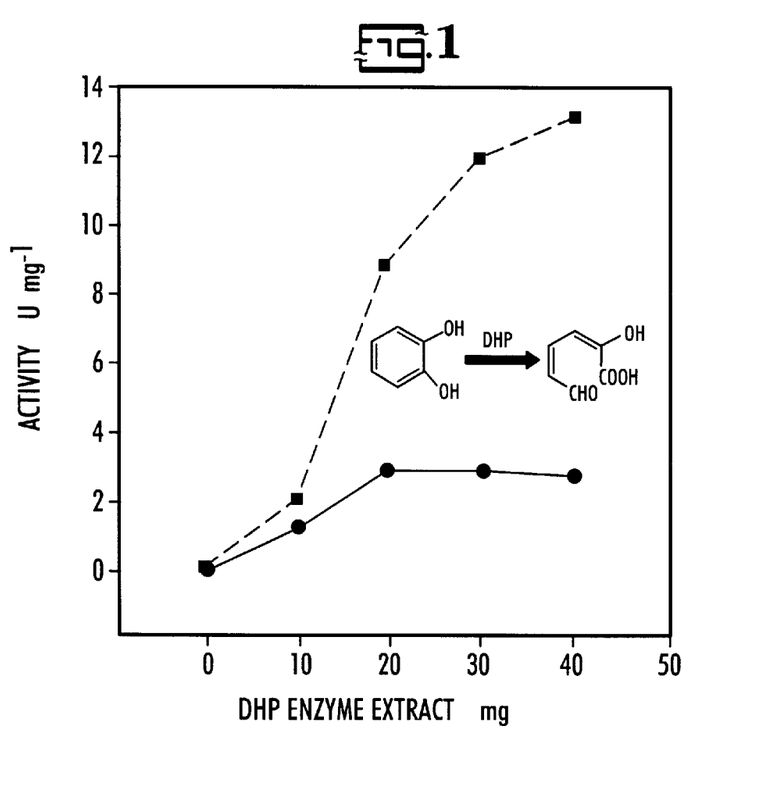
FIG. 1 shows the disappearance of 2,4,6-tribromophenol from reaction mixture as assayed by gas chromatography as a result of mineralization by the enzymes of *Spartina alterniflora*, according to a preferred embodiment of the present invention.
Figure 2:
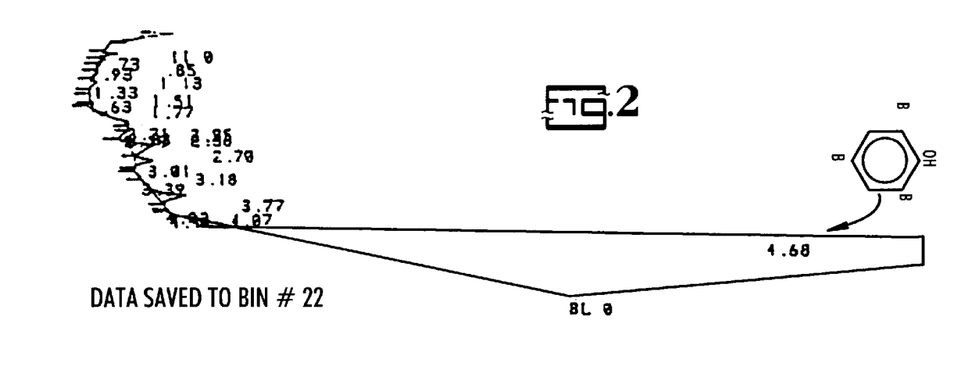
FIGS. 2 and 3 show an associated aromatic ring cleavage or 2,3-dioxygenase activity suggesting that the enzyme is a dioxygenase or that there is an enzyme complex with an extra diol dioxygenase partial activity.
Figure 3:
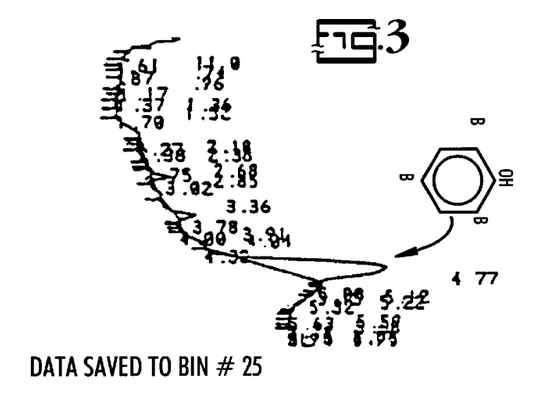
Figure 4:
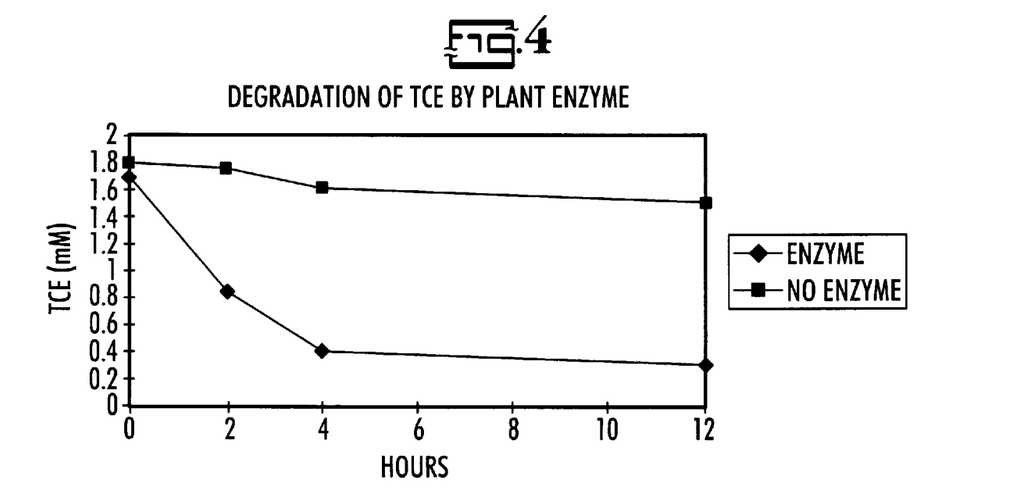
FIG. 4 shows the activity of the enzyme on trichloroethene.
Figure 5:
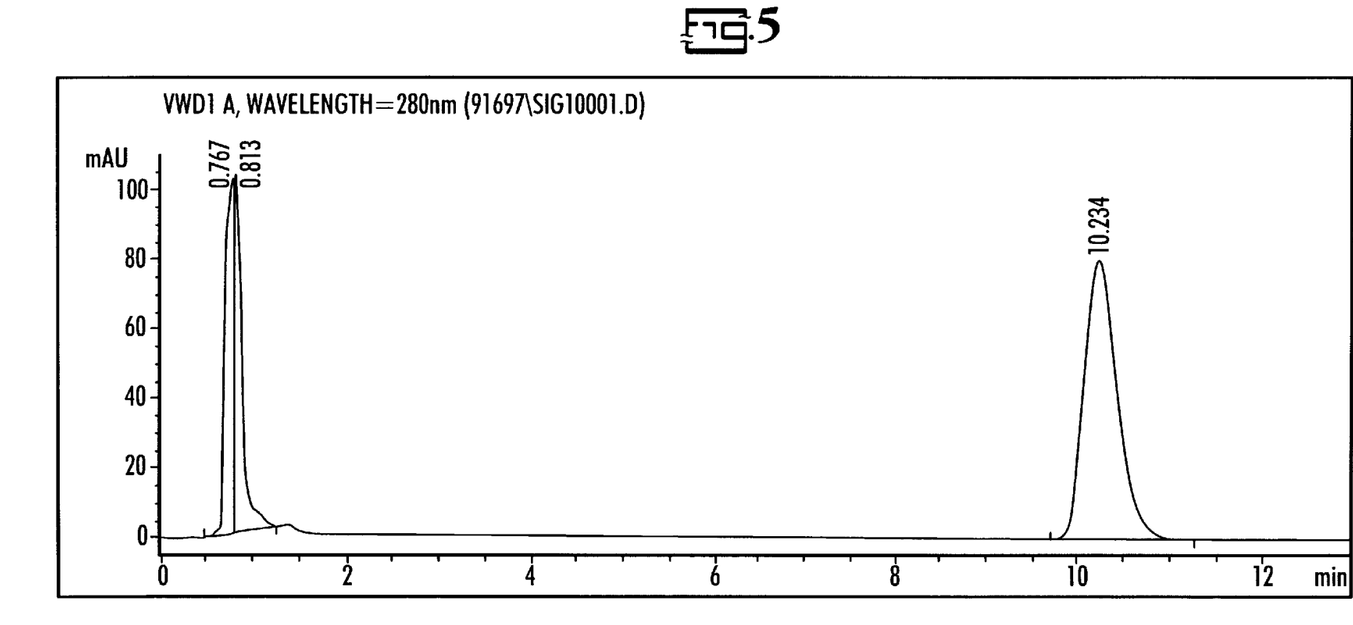
FIGS. 5–11 show the activity of the enzyme on trichloroethene, as assayed by gas chromatography.

FIGS. 1–11 illustrate the effectiveness of *Spartina alterniflora* on one haloaromatic compound, namely 2,4,6-tribromophenol (2,4,6-TBP). FIG. 1 shows the disappearance of 2,4,6-TBP from the reaction mixture as assayed by gas chromatography. There is an associated aromatic ring cleaving (FIGS. 2 and 3) or 2,3-dioxygenase activity suggesting that the enzyme is a dioxygenase, or that there is an enzyme complex with an extradiol dioxygenase partial activity. The enzyme(s) is also active on trichloroethene as shown in FIG. 4, as assayed with gas chromatography. HPLC monitoring of the reaction with 2,4,6-TBP reveals distinct aromatic intermediates that eventually disappear from the reaction mixture. The reaction therefore seems to proceed by dehalogenation of the aromatic nucleus followed by ring-cleavage.

Figure 6:
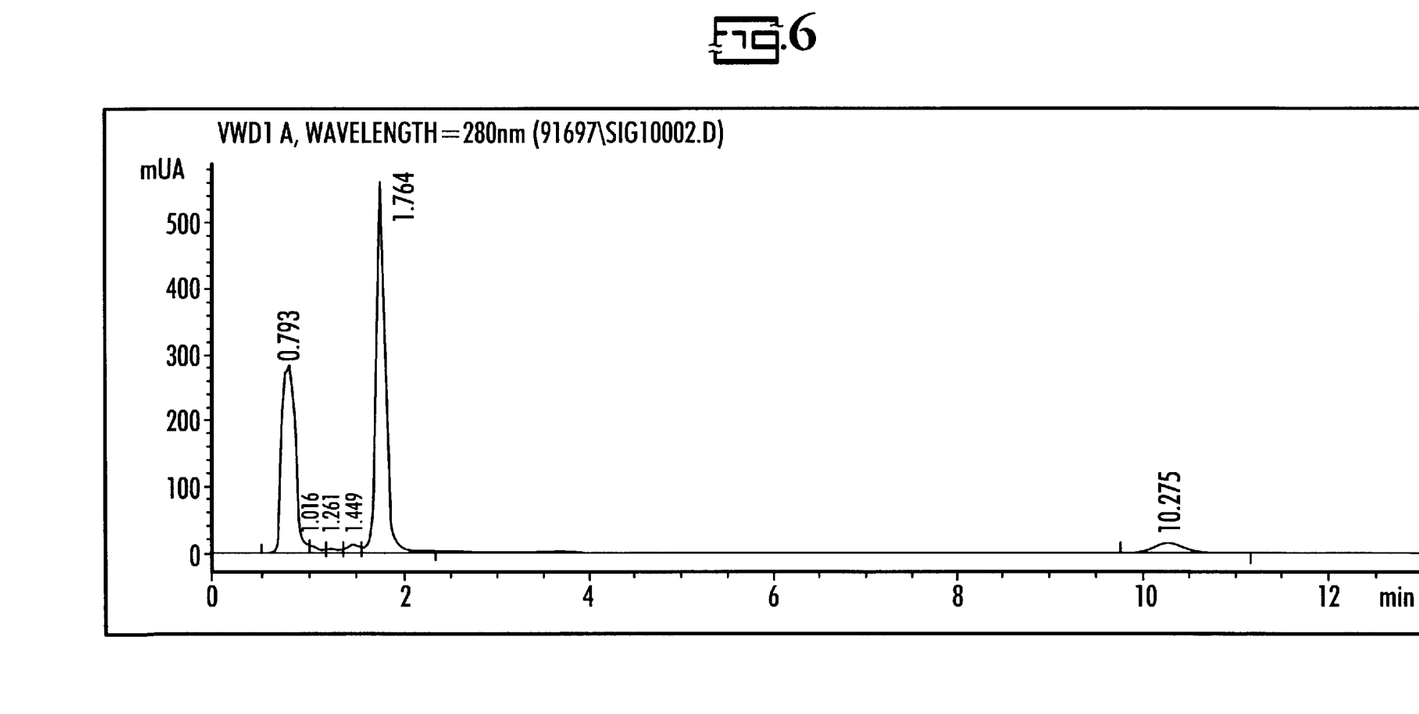
Figure 7:
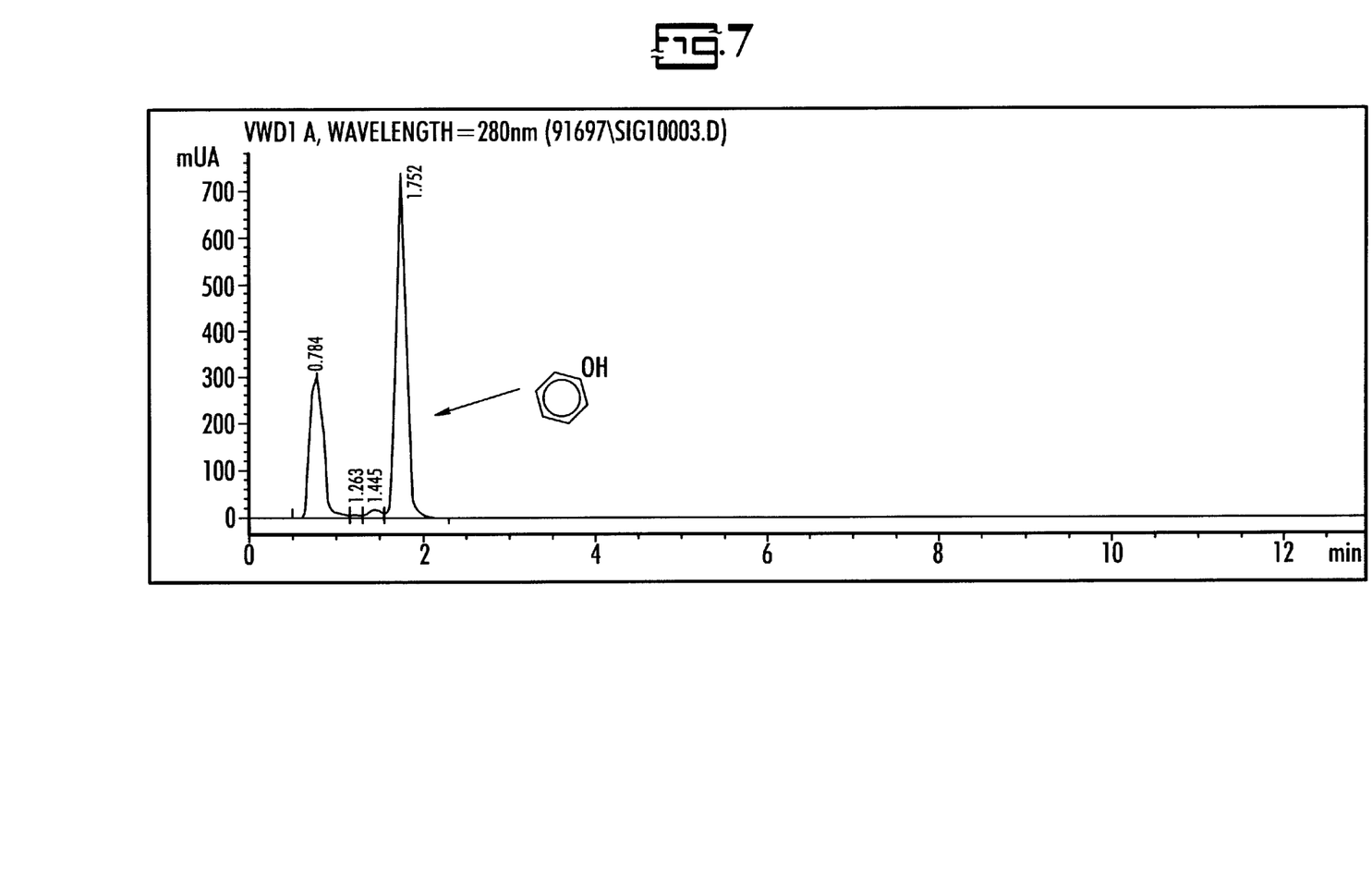
Figure 8:
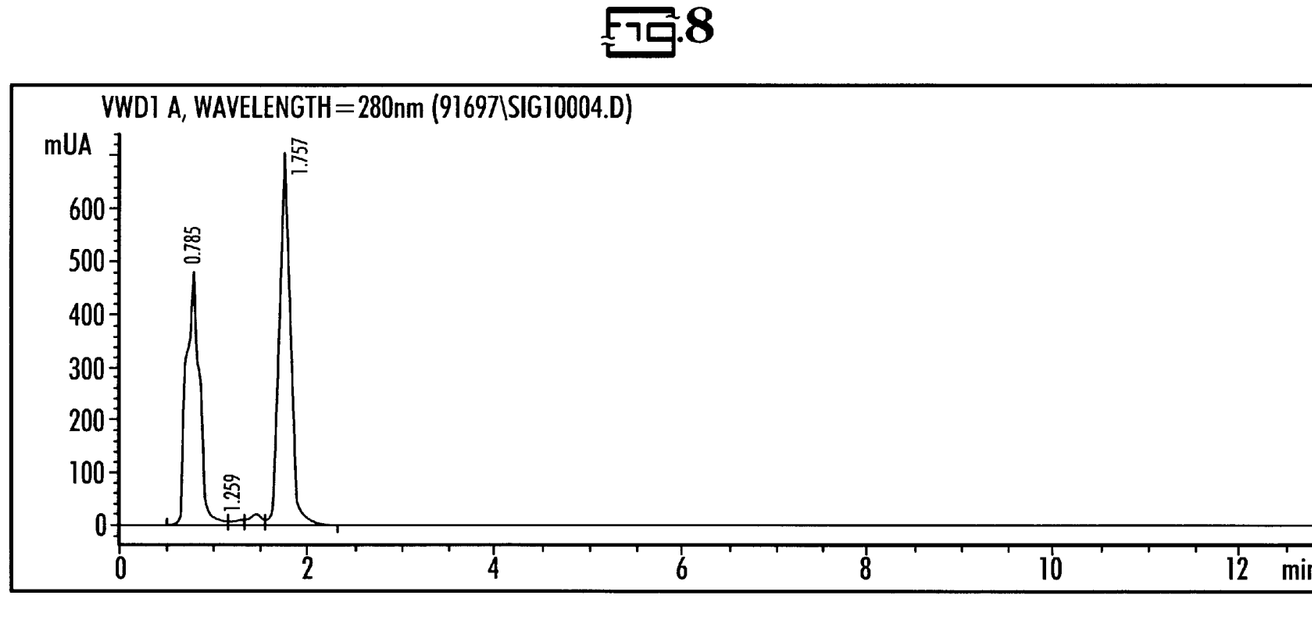
Figure 9:
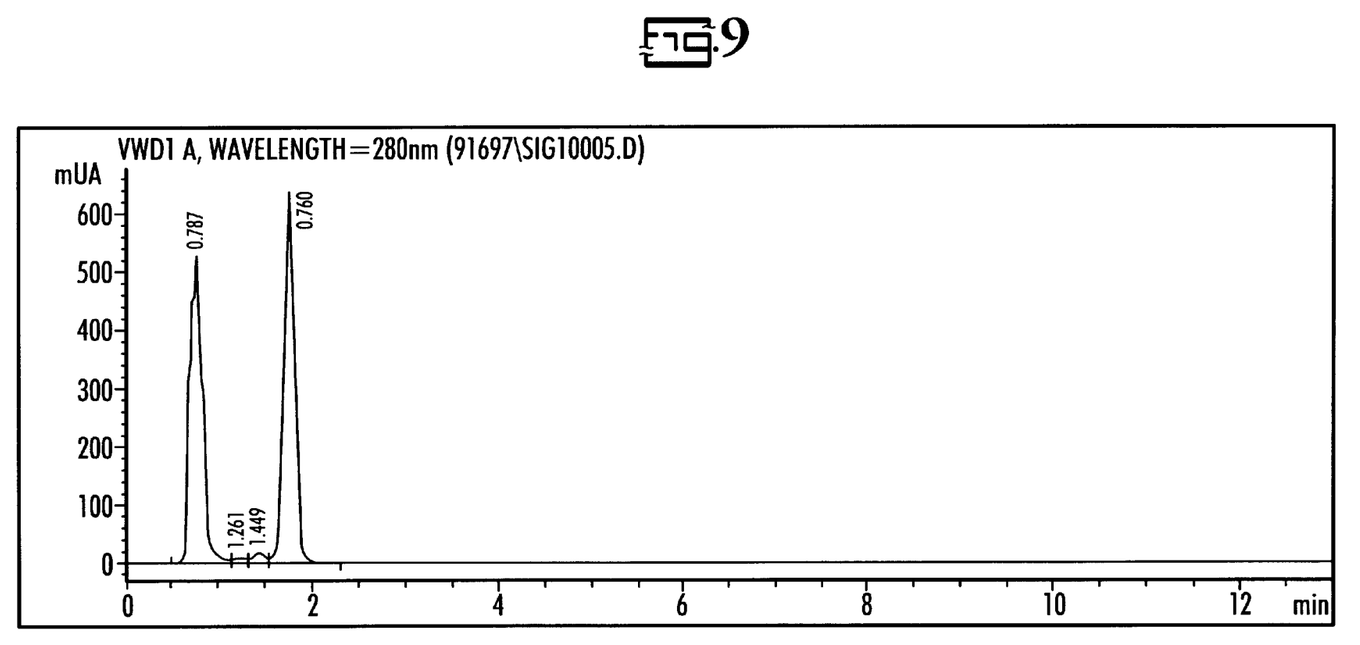
Figure 10:
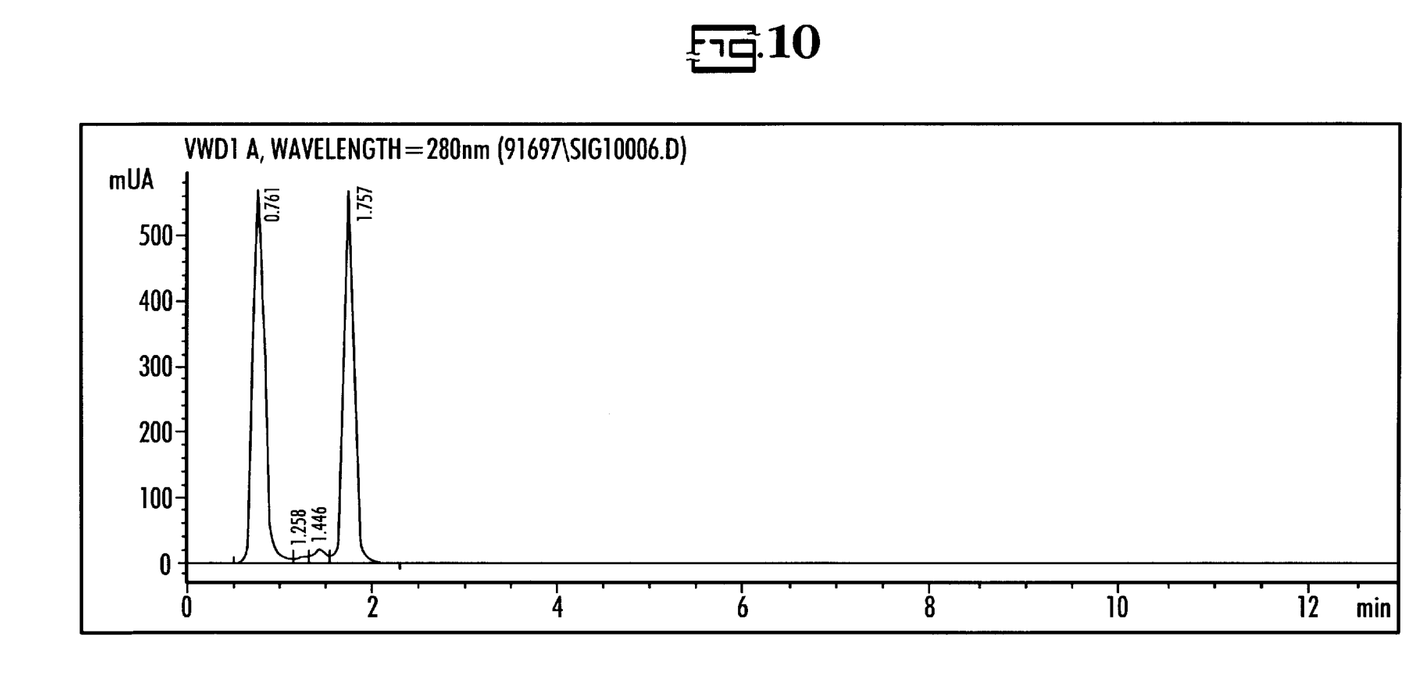
Figure 11:
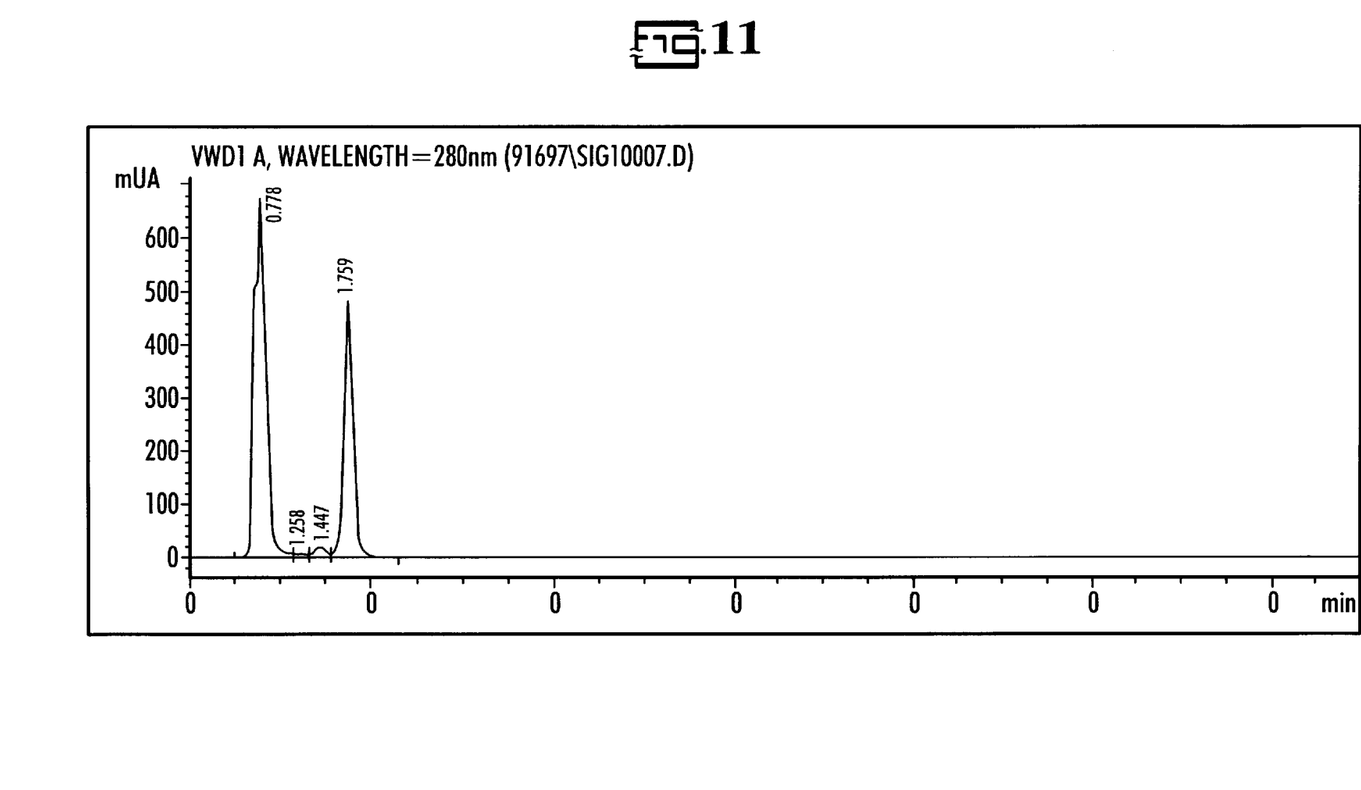

FIGS. 5–11 are seven datafiles of gas chromatographic results. These figures show the data files from high pressure liquid chromatography analyses of the detector's signal versus time. The signal is an analog of concentration of 2,4,6-TBP mixed with Spartina extract. FIG. X shows the initial concentration of 2,4,6-TBP, peaking at 10.275 minutes into the analysis. FIG. 6+1 illustrates the decrease of the 2,4,6-TBP peak and the rise of an intermediate degradation product at about 15 minutes into the analysis. At thirty minutes, the 2,4,6-TBP peak has all but disappeared and the first breakdown product has continued to peak; by forty-five minutes, the first breakdown product itself has begun to disappear. The remaining figures show the complete disappearance of the first breakdown product during the course of the next forty-five minutes.

*Spartina alterniflora* can be planted in area where it will grow and where halogenated organics have polluted the soil and groundwater. The plant will produce the enzyme that degrades halogenated organics and other organics, which enzyme will operate on the organics present to effect phyto remediation. The duration of the time to remediation of the organics to meet or exceed limits imposed by legal authorities will depend on the initial concentrations, the density of plantings, the hospitability of the environment to Spartina, and perhaps other factors. Modest experimentation will produce data enabling those of ordinary skill in the art to predict with reasonable certainty that time.

Tissue samples from *Spartina alterniflora* can be cultured and the cultured cells can be maintained in vitro successfully on various combinations of mineral salts, sugars, vitamins, amino acids, and plant growth regulators. Preferably, a culture medium would include (1) 4.3 grams of a mineral salt mixture first recommended by Murashige & Skoog in 1962 and sold commercially by SIGMA Chemical Co.; (2) 3 mL of a 6% w/v solution of KH2PO4 (Miller's solution); (3) 30 grams of sucrose; (4) vitamins that include 200 mg of Myo-Inositol and 2 mL of VITAMIX; (5) 200 mg of L-glutamine as an additional nutrient; (6) 200 mg of ammonium sulfate; (7) 1 mg of 2,4-dichlorophenoxyacetic acid as a growth regulator; and (8) 7 grams of agar. Vitamix contains 500 mg vitamin B1, 50 mg vitamin B6, 100 mg glycine, 50 mg nicotinic acid, 25 mg folic acid, and 50 mg biotin.

Identifying genes that produce enzymes may be a tedious task but one that is well known and, if carefully undertaken, results in the identification of the correct gene. Genetic engineering of a particular gene into other plants to develop other species that are also capable of producing the enzyme but that are suitable to a different ecological range is also a well known process. Once plants suitable to many climatological and ecological conditions are developed, the enzyme of *Spartina alterniflora* can be put to work wherever there is groundwater and soil contamination by halogenated organics.

One skilled in the art can do the following without undue experimentation.

Figure 12:
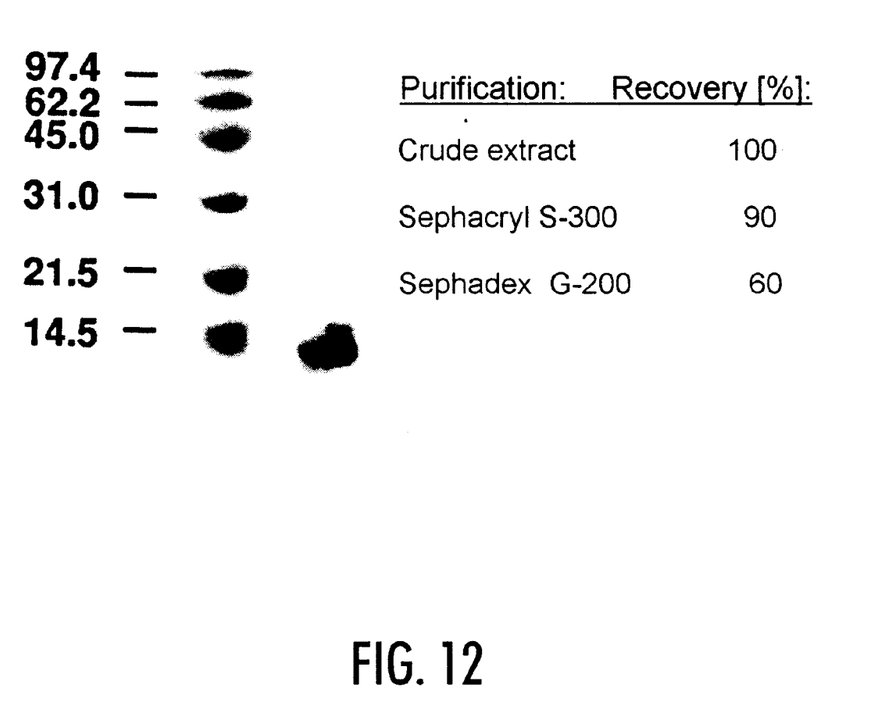
FIG. 12 illustrates the purification of dehalogenating enzyme to homogeneity. The molecular mass is estimated to be about 12 kilodaltons.

(1) Obtain partial N-terminal or internal amino-acid sequences (at least 10 residues) from the protein once it is purified by standard techniques (See, for example, FIG. 12). The amino-acid sequence can then be back-translated into DNA sequences, which are degenerate at certain third base pair positions because of the inherent degeneracy of the DNA code. These degenerate oligonucleotides can then be used to identify the cDNA from a cDNA library.

(2) Purify mRNA from roots and tissue cultures of *Spartina alterniflora* and used to prepare the cDNA. First, a full length cDNA is identified using radio- or fluorescent-labeled oligonucleotide probes. A combination of degenerate primers for the N-terminal region and for conserved internal regions of known peroxidase genes (peroxidase signatures) or dioxygenase genes ensures the identification of the proper cDNA. Automatic DNA sequencing can be carried out in any reasonably well-equipped DNA analysis facility using, for example, the Lseq and Rseq primers in Gene Hunter's AdSeq Kit C manufactured by Promega Corp.

The sequence obtained can be analyzed for similarity to known peroxidase and dioxygenase genes. Peroxidase genes from various organisms have been characterized, including peroxidase genes from plants (peroxidase genes or mRNA nucleotide sequences from at least 36 plant species are found in the EMBL and GENEBANK databases). Peroxidase genes can be very divergent at the nucleotide sequence level, except for certain conserved regions, including the active site.

Software for DNA analysis is widely available. Nucleotide query sequences based on the sequence data obtained from the isolated cDNAs can be compared against the GENEBANK database using BLAST and the FASTA programs of the GCG Wisconsin Package (version 8.0-UNIX). It is possible to identify motifs in the isolated cDNAs from which the function of the encoded protein can be deduced so that the identity of the cDNA clone as a peroxidase or dioxygenase sequence can be substantiated. Known motifs can be detected by the MOTIFS program in the GCG Wisconsin Package. Consensus sequences for peroxydases have been published (Kjærgrd et al. 1997) and can also be generated with the PRETTY program. They can also be used as the query sequences for FASTA searches in the GCG package, or for BLAST, BEAUTY or BLITZ searches in various databases.

The full length genomic clone with its own root-specific promoter can be isolated from a genomic library. Total genomic DNA isolated by standard procedures can be used for preparation of a genomic library, for example, in the LAMBDAFIX II system sold by Stratagene. Functional analysis can be carried out to determine if the gene encodes a protein having the predicted activity.

The regulatory (promoter and polyadenylation) regions of the gene are essential for successful expression of this gene in a heterologous host. We have observed toxicity when bacterial mono-and di-oxygenase genes were expressed from constitutive promoters in plants. In contrast to oxygenase genes of bacterial origin, however, plant genes carry all the necessary information for proper intracellular localization and eventual expression, and thus toxicity is unlikely. The isolated genes can be cloned into plant gene transfer vectors and introduced into alfalfa, for example, by Agrobacterium-mediated transformation. Phenotypic screening, i.e., demonstration of dehaloperoxidase and 2,3-dioxygenase activities can be carried out. A variety of plant gene transfer and expression vectors, both binary and high-copy number-type, reporter genes (GUS) as well as *Agrobacterium titmefaciens* are in regular use in many laboratories.

The pure enzyme may also be delivered in other ways and for other purposes than in situ remediation of ground water and soil contamination.

It will be apparent to those skilled in the art that many changes and substitutions can be made to the preferred embodiment herein described without departing from the spirit and scope of the present invention.

What is claimed is:

1. A method of detoxifying contaminated soil comprising the steps of:

treating said contaminated soil with a plant-derived dehaloperoxidase enzyme; and allowing said enzyme to degrade the contaminants.

2. The method according to claim 1 wherein said contaminated soil is contaminated with halo-organic compounds.

3. The method according to claim 2 wherein said halo-organic compounds comprise haloaromatic compounds.

4. The method according to claim 3 wherein said haloaromatic compounds are bromine-substituted aromatic compounds.

5. The method according to claim 3 wherein said haloaromatic compounds are fluorine-substituted aromatic compounds.

6. The method according to claim 3 wherein said haloaromatic compounds are iodine-substituted aromatic compounds.

7. The method according to claim 3 wherein said haloaromatic compounds are chlorine-substituted aromatic compounds.

8. The method according to claim 2 wherein said halo-organic compounds comprise haloaliphatic compounds.

9. The method according to claim 8 wherein said haloaliphatic compounds comprise trichloroethene.

10. The method according to claim 1 wherein said plant-derived dehaloperoxidase enzyme is extracted from a plant belonging to the Spartina genus.

11. The method according to claim 10 wherein said plant is *Spartina alterniflora*.

12. The method according to claim 1 wherein plant-derived dehaloperoxidase enzyme is extracted from genetically engineered plant with at least one gene taken from Spartina genus plants so that said genes express at least one halogenated organics-mineralization dehaloperoxidase enzyme.

13. A method of detoxifying contaminated soil comprising the steps of:

planting a contaminated patch of soil with a plant producing at least one halogenated organics-mineralization plant dehaloperoxidase enzyme; and allowing said plants to detoxify said contaminated soil.

14. The method according to claim 13 wherein said contaminated soil is contaminated with halo-organic compounds.

15. The method according to claim 14 wherein said halo-organic compounds comprise haloaromatic compounds.

16. The method according to claim 15 wherein said haloaromatic compounds are bromine-substituted aromatic compounds.

17. The method according to claim 15 wherein said haloaromatic compounds are fluorine-substituted aromatic compounds.

18. The method according to claim 15 wherein said haloaromatic compounds are iodine-substituted aromatic compounds.

19. The method according to claim 15 wherein said haloaromatic compounds are chlorine-substituted aromatic compounds.

20. The method according to claim 14 wherein said halo-organic compounds comprise haloaliphatic compounds.

21. The method according to claim 20 wherein said haloaliphatic compounds comprise trichloroethene.

22. The method according to claim 13 wherein said plant with dehaloperoxidase enzyme belongs to the Spartina genus.

23. The method according to claim 22 wherein said plant is *Spartina alterniflora*.

24. The method according to claim 13 wherein said plant is genetically engineered with at least one genes taken from Spartina genus plants so that said genes express at least one halogenated organics-mineralization dehaloperoxidase enzyme.

25. The method according to claim 24 wherein said at least one gene is taken from *Spartina alterniflora*.

* * * * *